Dec. 11, 1951  R. R. LAW  2,577,971
MICROWAVE CAVITY RESONATOR DEVICE
Filed May 14, 1947  3 Sheets-Sheet 2

Inventor
RUSSELL R. LAW
By William A. Zalesak
Attorney

Dec. 11, 1951 R. R. LAW 2,577,971
MICROWAVE CAVITY RESONATOR DEVICE
Filed May 14, 1947 3 Sheets-Sheet 3
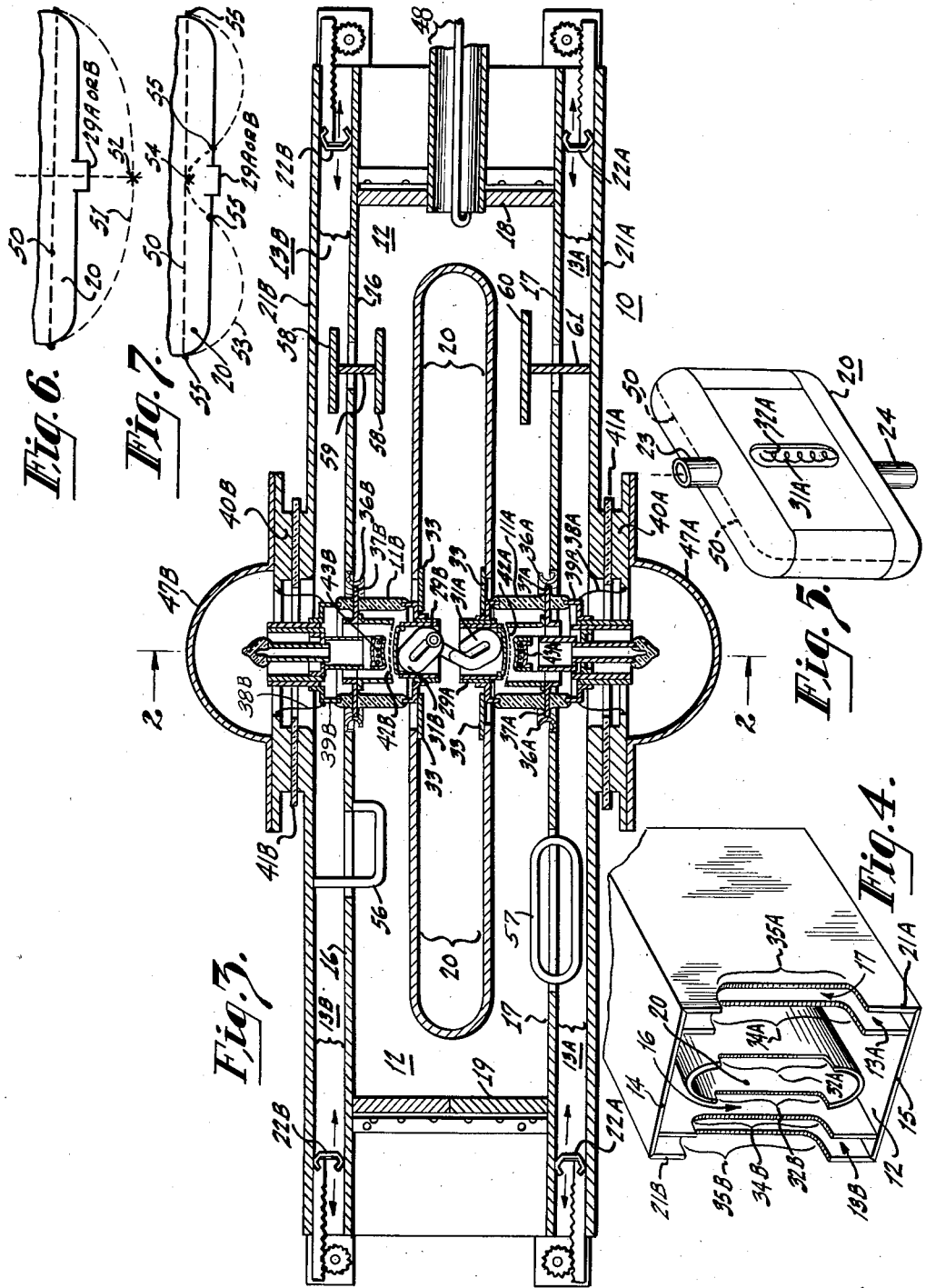
Inventor
RUSSELL R. LAW
By William A. Zaleski
Attorney Patented Dec. 11, 1951

2,577,971

UNITED STATES PATENT OFFICE 2,577,971

MICROWAVE CAVITY RESONATOR DEVICE

Russell R. Law, Princeton, N. J., assignor to Radio Corporation of America, a corporation of Delaware Application May 14, 1947, Serial No. 748,057

13 Claims. (Cl. 315—6)

This invention relates to cavity resonators used with electronic tubes, particularly of the elongated electrode type, for production of high power at ultra high frequencies.

In accordance with this invention, there is disposed within a cavity resonator a shell member having such shape and dimensions that for at least one resonant mode of the cavity resonator there are potential or voltage anti-nodes at opposite faces of the shell member and a potential or voltage node extending peripherally thereof. The shell is effectively connected at its opposite anti-nodes to corresponding electrodes, specifically the anodes, of two electronic tubes whose other electrodes, specifically the grids and cathodes, are respectively connected to wall structure forming two outer cavity resonators, one on either side of the cavity resonator in which the shell member is disposed.

Further in accordance with the invention, the outer cavity resonator may be coupled to the central cavity resonator so that the electronic tubes and cavity resonator function as a push-pull oscillator for generation of power at a frequency determined by the cavity resonator dimensions. Preferably, the dimensions of the central or anode-grid cavity resonator are fixed, but its excitation mode may be changed for generation of power at different frequencies by adjustment of tuning plungers, or equivalent, effective to change the dimensions of the outer or grid-cathode cavity resonators.

Further in accordance with the invention, the shell member is mechanically supported at its aforesaid peripheral potential node in avoidance of electrical breakdown of the insulating supports. More specifically, the shell is supported from opposite exterior sides of the central cavity resonator to facilitate connection between a source of cooling liquid and anode cooling coils disposed within the shell member.

The invention further resides in features of features of construction, combination and arrangement hereinafter described and claimed.

For more detailed understanding of the invention and for illustration of a preferred form thereof, reference is made to the accompanying drawings, in which:

Figure 3 is a horizontal sectional view taken in the plane of longitudinal symmetry of the cavity resonator device of Fig. 1;

Figure 4 is a perspective view, in section and with parts omitted, showing the relation of the shell member and cavity resonators of Figs. 1 to 3;

Figure 5 is a perspective view of the shell member of the preceding figures; and Figures 6 and 7 are explanatory figures referred to in discussion of the modes of excitation of the cavity resonator device.

Figure 1:
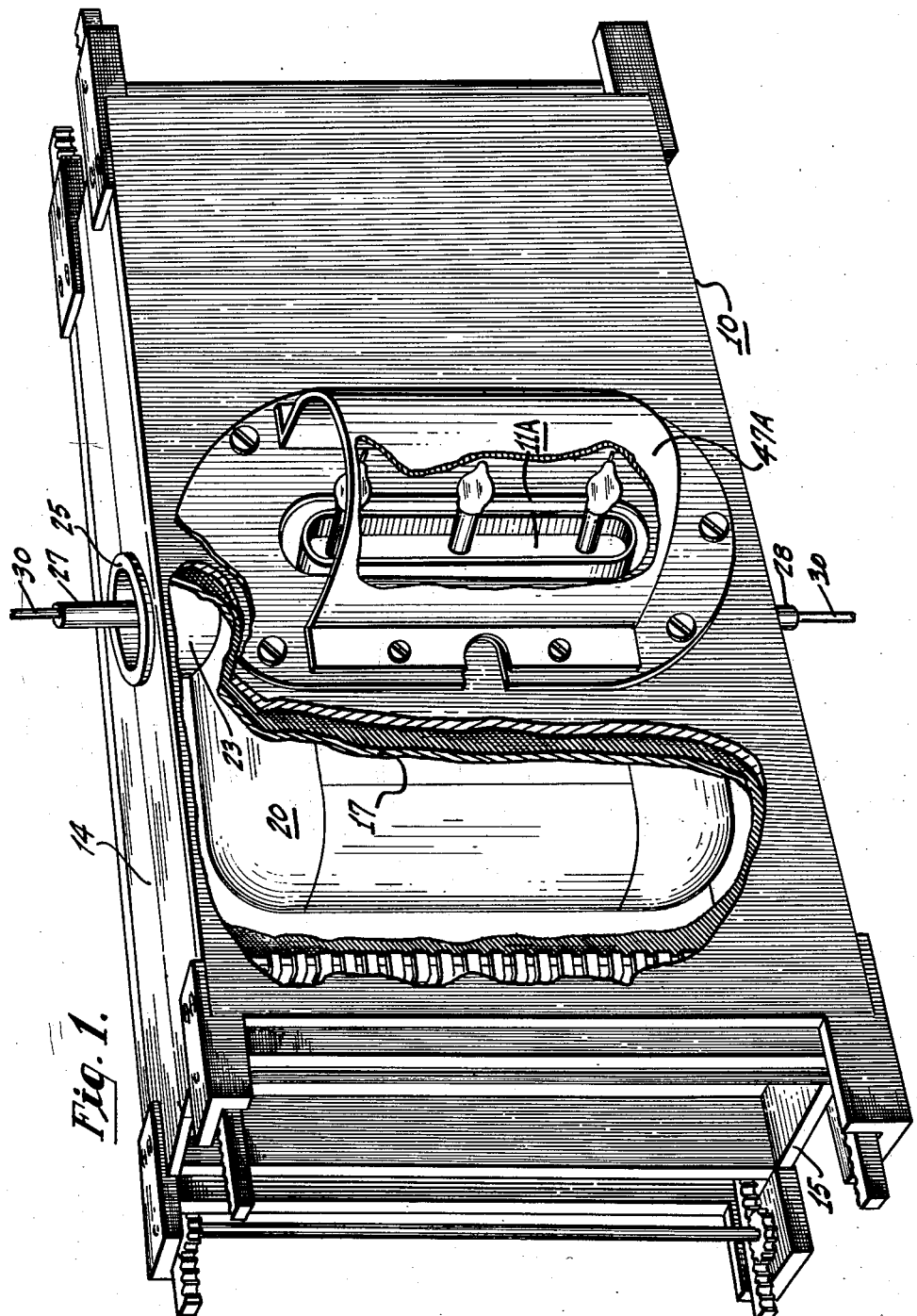
Figure 1 is a perspective view, with parts broken away, of a cavity resonator device embodying the invention with the electronic tubes in place.
Figure 2:
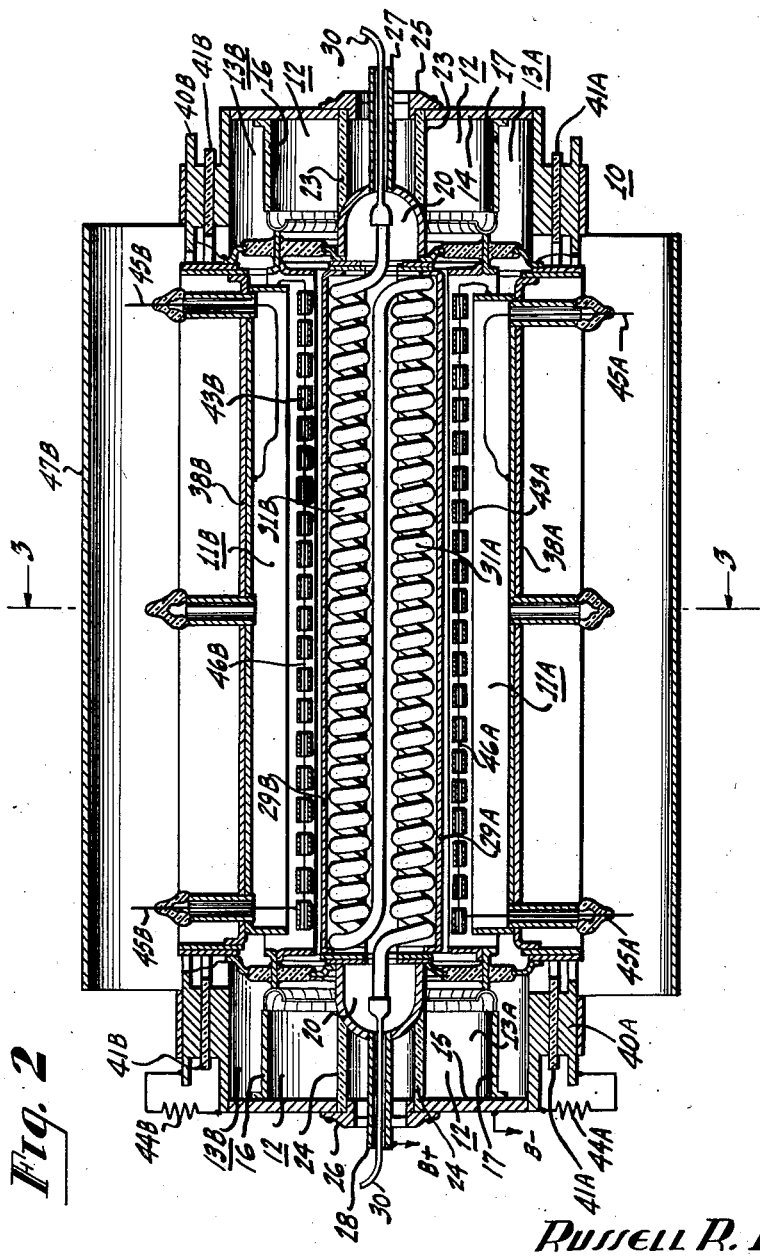
Figure 2 is a vertical sectional view taken in the plane of transverse symmetry of the cavity resonator device of Fig. 1.

The cavity resonator device 10 shown in Figs. 1 to 3 is particularly suited for use with a pair of elongated electrode electronic tubes 11A, 11B of the type disclosed and claimed in copending application Serial No. 549,513, filed August 15, 1944, now Patent No. 2,481,026, dated September 6, 1949, for the production of substantial power at ultra-high frequencies. By way of example, with a pair of such tubes, the cavity resonator disclosed generated peak power of the order of 50 kilowatts at frequencies of the order of 1200 megacycles for one mode of excitation, and for another mode produced a peak power of 100 kilowatts at a frequency of about 400 megacycles.

The resonant resonator device 10 comprises conductive wall structure defining an elongated central cavity resonator 12 and two elongated outer cavity resonators 13A, 13B, disposed side-by-side as evident from Figs. 1 to 4. The top, bottom and sides of the central cavity resonator 12 are formed respectively by metallic plates or strips 14, 15, 16 and 17, and the ends of the cavity resonator 12 are formed by vertical plates or sheet members 18 and 19. As shown in Figs. 3–5, the structure defining the central cavity resonator 12 has the form of an elongated rectangular box which has a length substantially greater than its other two major dimensions and is oblong in cross-section in planes perpendicular to each of the three major dimensions thereof. Within the central cavity resonator 12 and spaced from all walls thereof is symmetrically disposed an elongated hollow shell member 20, best shown in Fig. 5, which generally is of the shape of a substantially closed rectangular box substantially similar in cross-section to the cavity resonator 12, with all corners and edges substantially rounded to avoid corona, or arcing, at the high voltages developed within the cavity resonator 12.

The outer cavity resonator 13A is defined by the plates 17 and 21A as side walls, extensions of plates 14 and 15 as top and bottom walls and plungers 22A as end walls. Similarly the outer cavity resonator 13B is defined by plates 16 and 21B as side walls, extensions of plates 14 and 15 as top and bottom walls and plungers 22B as end walls. The three cavity resonators are side-by-side with their wide faces parallel.

The shell 20 is supported within the central cavity resonator 12 by a pair of sleeves 23, 24, Figure 2, of suitable insulating material such as polystyrene. The insulating sleeves 23, 24 are retained in place by the caps 25, 26 respectively suitably fastened to the side walls 14, 15 of the cavity resonator device 10.

The tubular conductors 27 and 28 which extend outwardly from the top and bottom of shell 20 pass through the insulating sleeves or collars 23, 24 and provide for connection of a source of direct-current voltage to the anodes 29A, 29B of the electronic tubes 11A, 11B. The anode voltage used for operation of the above-identified tubes at 1200 megacycles and 400 megacycles may be of the order of 10 kilovolts. The tubular terminals 27, 28 also support the ends 30, 30 of the cooling coils 31A, 31B which, when the electronic tubes 11A, 11B are in place, nest within the anodes 29A, 29B. The circulation of a cooling liquid, such as water, through the coils 31A, 31B, or their equivalent, permits safe operation of tubes 11A, 11B at high power levels.

The opposite side faces of the shell 20 are provided with the centrally located and vertically elongated openings 32A, 32B, Figs. 4 and 5, through which the hollow anodes of tubes 11A, 11B extend to embrace their respective cooling coils 31A, 31B. The openings 32A, 32B are each circumscribed by a row of spring contact fingers 33 which electrically connect the opposite faces of the shell to the anodes 29A, 29B of the tubes. The anodes are therefore at the same direct-current potential but, as hereinafter appears, their radio-frequency potentials are 180° out-of-phase.

The elongated opening 32A of the shell 20 is in alignment with similar openings 34A, 35A in the cavity resonator walls 17 and 21A for insertion of the elongated-electrode tube 11A into one side of the cavity resonator device 10. The contact fingers 36A disposed about the opening 34A in the common wall 17 of cavity resonators 12 and 13A engage the grid flange 37A of tube 11A, so that the grid of tube 11A is at the same potential as the adjacent portion of wall 17. Similarly the conductors 38A connect the cathode terminal 39A of tube 11A to the apertured plate 40A which is mechanically supported from the wall 21A but electrically isolated therefrom, so far as direct currents are concerned, by the apertured strip 41A of mica, or other suitable dielectric. The overlying areas of plate 40A and wall 21A with the interposed dielectric 41A form a by-pass condenser so that so far as radio-frequency energy is concerned, the cathode of the tube is at the same potential as the contiguous portion of outer wall 21A of cavity resonator 13A.

In like manner, the elongated opening 32B in the opposite face of shell 20 is in alignment with generally similar openings 34B, 35B in the cavity resonator walls 16 and 21B for insertion of the elongated electronic tube 11B. The elongated grid 42B of tube 11B is connected through its flange 37B to the contact fingers 36B of cavity 12 in the same manner that grid 42A of tube 11A is connected to the opposite side of the shell 20 through flange 37A and contact finger 36A. The cathode 43B of tube 11B is connected through its terminal plate 39B and conductors 38B to the plate 40B insulated from exterior wall 21B of the outer cavity resonator 13B by the apertured dielectric strip 41B but at the same radio-frequency potential.

The tubes 11A, 11B extend into opposite sides of the resonator device 10 with the plane of their longitudinal axes normal to the plane of vertical longitudinal symmetry of the cavity resonator device.

The resistors 44A, 44B, Figure 2, are traversed by the direct-current component of the anode current of tubes 11A, 11B and provide direct-current bias for the grids of the tubes. In the example given, the resistance of each of resistors 44A, 44B was of the order of three ohms. The terminals 45A, 45B for connection to the heaters 46A, 46B of the tubes are protected by the curved guard plates 47A, 47B which may be attached to plates 40A, 40B.

So far as radio-frequency energy is concerned, all of the exterior parts and surfaces of the resonator device are "cold" so that the only external insulating precautions required are those necessary to prevent direct-current grounding of the external parts at anode or cathode potential. This not only greatly simplifies the mounting problems but also means there are no radiation losses undesirably lowering the unloaded "Q" of the resonator device.

High-frequency energy may be transferred from the resonator device 10 to any suitable load, such as an antenna, not shown, preferably by a concentric line 48 whose outer conductor is connected to the outer wall structure of cavity resonator 12 and whose inner conductor extends into the cavity resonator at suitable point to serve as an input probe or input loop for the transmission line 48. In the particular arrangement shown, the line 48 is inductively coupled to the cavity resonator by a loop 49.

The central cavity resonator 12 is of such dimensions that for at least one resonant mode corresponding with a desired frequency of operation, all points of the surface of shell 20 lying in the peripheral line 50, Figs. 5, 6 and 7, are at a potential node. Consequently, there is no appreciable radio-frequency voltage-gradient in the vicinity of the shell-supporting insulators 23 and 24 and therefore, despite the very high frequency, internal heating of the insulator dielectric, which would eventually result in its electrical breakdown, is inappreciable. So far as mechanical support of shell 20 is concerned, the insulators may be located to engage it at any point or points along the peripheral node 50 but the positions illustrated are preferred to simplify mounting of the cooling coils 31A, 31B of anodes 29A, 29B which for seasons which soon appear in discussion of Figs. 6 and 7 extend vertically of the shell member 20 as viewed in Figs. 1 and 2.

For one of the aforesaid resonant modes of cavity resonator 12, the instantaneous potential gradient across a vertical face of shell 20 may be represented by the broken line curve 51 which has an anti-node 52 at or adjacent the center of the shell, that is, along the plane of transverse symmetry selected for connection to the anode 29A (29B) of one of the tubes 11A, 11B; at the same instant, the anode 29B (29A) of the other of the tubes is at a voltage anti-node of opposite polarity.

For the particular cavity resonator dimensions later herein given, this mode of excitation exists at a frequency of about 400 megacycles. When this cavity resonator is excited at another mode, specifically at about 1200 megacycles, there is again the peripheral node 50, Figure 7, but instead of one potential anti-node lengthwise of shell 20, there are several as indicated by curve 53; the intermediate one, 54, coincident with the anode of the associated tube. At this higher frequency, the tube reactances are of greater effect and, consequently, as generally appears from Fig. 7, the physical distances between the several nodal points 55 are not uniform though they are symmetrical in either direction from the central anti-node 54. With this mode of excitation of cavity resonator 12, the instantaneous potentials of the two anodes are 180° out of phase.

For use of the resonator device 10 as a push-pull oscillator, the push-pull stage thus far described is additionally provided with coupling means between the central or anode-grid cavity resonator 12 and each of the outer or grid-cathode cavities 13A, 13B. This feedback coupling may be any of the four types shown in Fig. 3. The feedback may be by inductive coupling as effected by a partial loop 56 connected to opposite walls of one cavity resonator and extending into the adjacent cavity resonator or by a complete loop 57 linking the magnetic fields of two adjacent cavity resonators: the feedback may be by capacitive coupling as effected by plates 58 respectively disposed in two adjacent cavity resonators and connected by a conductive strip or post 59; or the capacitive coupling may be effected by a plate 60 disposed in one cavity resonator and connected as by conductor 61 to the opposite side of the adjacent cavity resonator. One of the species of couplings, say 56, between chambers 13B and 12 and a similar coupling between chambers 13A and 12 will provide sufficient regeneration usually. However if more regeneration is needed two of such couplings may be used between chamber 12 and each outer chamber. Other of the species of couplings 57, 58 and 60 may be similarly used as desired.

When the oscillator is to be used at different modes of excitation of the central or output cavity resonator 12, the range of adjustment of the plungers 22A, 22B must of course be sufficient to attain the proper phasing of the feedback voltage for any of the different modes. Though a rack and pinion arrangement for adjusting the plungers is shown, it is obvious any other suitable arrangement may be used. When operation at only one mode and frequency is contemplated, the plungers may be replaced by fixed end walls at proper location.

For operation at about 1200 and 400 megacycles with the above-identified tubes, the length, width and height of the central cavity resonator are respectively about 12 inches, 4 inches and 11 inches. As Figs. 1, 2 and 3 are approximately to scale, the dimensions of the other cavity resonators and components may be determined.

It shall be understood the invention is not limited to the particular construction disclosed and that changes and modifications may be made within the scope of the appended claims.

What is claimed is:

1. A resonator device, for use with a pair of electronic tubes having corresponding electrodes and at a particular frequency in a predetermined mode, comprising conductive wall structure defining a cavity resonator, and a conductive hollow shell member within said cavity resonator and spaced from said wall structure, said wall structure having openings in opposite sides of said device for insertion of said tubes effectively to connect corresponding electrodes thereof to said shell member, said shell member having during operation in at least said predetermined mode of said cavity resonator potential anti-nodes at opposite regions thereof where said electrodes are connected thereto.

2. A resonator device for operation at a particular frequency in a predetermined mode comprising conductive wall structure defining a cavity resonator, a conductive shell member within said cavity resonator and spaced apart from said wall structure, said shell member having for at least one resonant mode of said cavity resonator a potential node extending peripherally thereof, a cooling coil within said shell member, and fluid connections extending to said coil through said shell at spaced points, said points being located along said peripheral potential node during operation of said device.

3. A cavity-resonator device, for operation at a particular frequency in a predetermined mode and for use with a pair of electronic tubes having corresponding electrodes, comprising wall structure defining a cavity resonator of oblong cross-section, a conductive hollow shell member within said cavity resonator and spaced from said wall structure, and supporting structures extending from the inner narrow faces of said cavity resonator to engage said shell member at spaced points, the wide faces of said cavity resonator having openings for insertion of said tubes effectively to connect corresponding electrodes thereof to said shell member.

4. A resonator device, for use with a pair of elongated-electrode tubes each having electrodes including an anode, comprising conductive wall structure defining a cavity resonator, a conductive shell member within said cavity resonator and spaced from said wall structure, said wall structure having openings for insertion of said tubes effectively to connect their anodes to said shell member, and insulating supporting members within said cavity resonator and engaging said shell member at its periphery.

5. A push-pull resonator device, for use with a pair of elongated-electrode tubes having corresponding electrodes, comprising conductive wall structure defining three cavity resonators disposed side by side, a conductive shell within the central cavity resonator and spaced from the walls thereof, supporting members for said shell extending from the periphery thereof to said wall structure, said wall structure and shell having aligned openings for insertion of said tubes and for connection of their corresponding electrodes respectively to said shell and to the walls defining said cavity resonators.

6. A push-pull resonator device, for use with a pair of electron discharge devices each having electrodes including an anode, comprising conductive wall structure defining three cavity resonators disposed side-by-side, a conductive shell within the intermediate resonator, cooling-coil means in said shell for cooling the anodes of said tubes, and fluid connections for said coil means extending through opposite exterior sides of said intermediate resonator from peripheral regions of said shell, the exterior walls of the other two resonators having openings for insertion of the tubes effectively to connect them to said resonators and with their anodes in heat-transfer relation with said cooling means.

7. A push-pull resonator device, for use with a pair of electronic tubes each having an anode, a control electrode and a cathode, comprising conductive wall structure defining three cavity resonators disposed side-by-side, a conductive shell within the intermediate resonator adapted to be connected with the anodes of said tubes, when in operation, to develop oscillating voltages in said device and on the periphery of said shell, said anodes being adapted to be connected to said shell at potential anti-nodes, means for effectively connecting the control electrodes of said tubes respectively to the wall structure common to the intermediate resonator and different ones of the outer resonators, means for effectively connecting the cathodes of said tubes respectively to the exterior walls of the resonators, and means for electrically coupling the intermediate resonator to each of the outer resonators for generation of oscillation by said tubes and resonators.

8. A resonator device comprising conducting wall structure defining three cavity resonators disposed side-by-side, plungers adjustable to vary the resonant frequency of the outer resonators, a conductive shell within the intermediate resonator, said shell having, during operation, at least two resonant modes at frequencies within the range of adjustment of said plungers and having potential anti-nodes at opposite faces and a peripheral potential node.

9. A resonator device comprising conductive wall structure defining a cavity resonator having one of its major dimensions substantially greater than its other major dimensions and having an oblong cross-section in planes perpendicular to said one major dimension, and a conductive shell member of substantially similar shape and cross-section symmetrically disposed within said cavity resonator and spaced at all points from said wall structure.

10. A resonator device comprising conductive wall structure defining a cavity resonator in the form of a rectangular box having a length substantially greater than its other two major dimensions and which is oblong in cross-section in planes perpendicular to each of the three major dimensions thereof, and a conductive shell member of substantially similar form and cross-section symmetrically disposed within said cavity resonator and spaced at all points from said wall structure.

11. An ultra-high frequency push-pull stage comprising conductive wall structure defining three cavity resonators disposed side-by-side, a conductive shell within the intermediate cavity resonator, a pair of electron discharge devices each having elongated-electrodes including an anode and anode flange, a grid and a grid flange and a cathode and a cathode flange, couplings between the respective anodes and opposite sides of said shell, couplings between the cathode flanges respectively and the outer walls of the outer cavity resonators, and couplings between the grid flanges respectively and the walls common to the intermediate cavity and the two outer cavity resonators.

12. An ultra-high frequency push-pull oscillator comprising conductive wall structure defining three cavity resonators disposed side-by-side, a conductive shell within the intermediate cavity resonator, a pair of electron discharge devices each having elongated-electrodes, said devices extending back-to-back and each having an anode and a flange therefore, a cathode and a flange therefore and a grid and a flange therefore, couplings between the respective anode flanges and said shell, couplings between the respective cathode flanges and the outer wall of different ones of the outer resonators, couplings between the respective grid flanges and the walls common to different ones of said outer resonators and the intermediate resonator, and positive feedback coupling means between said intermediate cavity resonator and each of said outer cavity resonators.

13. An ultra-high frequency push-pull oscillator comprising conductive wall structure defining three cavity resonators of oblong cross-section disposed side-by-side with their wide faces parallel, a conductive shell member of similar cross-section and orientation disposed within the intermediate resonator, feedback means coupling the intermediate cavity resonator to each of the outer cavity resonators, a pair of electron discharge devices each having elongated electrodes including an anode, a cathode and a control grid, said devices extending through the opposite wide faces of the outer cavity resonators and into opposite sides of the intermediate cavity resonator, and having their anodes connected to and transversely of the opposite wide faces of said oblong shell member, flanges for the grids, means connecting the grid flanges of the devices respectively to the wide walls common to the intermediate cavity resonator and to the interior wall of different ones of the outer cavity resonators, and means including a blocking-condenser in part formed by the exterior wall of the corresponding outer cavity resonator coupling the cathode of each of said devices to said exterior wall.

RUSSELL R. LAW.

REFERENCES CITED

The following references are of record in the file of this patent:

UNITED STATES PATENTS

| Number | Name | Date |
|---|---|---|
| 2,096,459 | Kassner | Oct. 19, 1937 |
| 2,153,728 | Southworth | Apr. 11, 1939 |
| 2,239,421 | Haeff | Apr. 22, 1941 |
| 2,284,405 | McArthur | May 26, 1942 |
| 2,404,261 | Whinnery | July 16, 1946 |
| 2,407,667 | Kircher | Sept. 17, 1946 |
| 2,408,409 | Bowen | Oct. 1, 1946 |
| 2,446,829 | Hergenrother | Aug. 10, 1948 |
| 2,457,194 | Anderson | Dec. 28, 1948 |
| 2,485,400 | McArthur | Oct. 18, 1949 |